United States Patent [19]
Burney

[11] Patent Number: 5,184,232
[45] Date of Patent: Feb. 2, 1993

[54] HOLOGRAPHIC DISPLAY IMAGING PROCESS

[76] Inventor: Michael Burney, 618 Lincoln Blvd. No. 5, Santa Monica, Calif. 90402

[21] Appl. No.: 102,780

[22] Filed: Sep. 23, 1987

Related U.S. Application Data

[63] Continuation-in-part of Ser. No. 919,551, Oct. 15, 1986, abandoned, which is a continuation-in-part of Ser. No. 788,248, Oct. 17, 1985, abandoned.

[51] Int. Cl.⁵ .......................... G02B 1/04; G02B 1/22; H04N 13/00
[52] U.S. Cl. ........................ 359/32; 358/90; 359/34; 359/35
[58] Field of Search ................ 350/3.6, 3.66; 358/90; 359/32, 34, 35

[56] References Cited

U.S. PATENT DOCUMENTS 3,566,021 2/1971 Jakes, Jr. ............................. 358/90

OTHER PUBLICATIONS

Caulfield et al., *The Applications of Holography* pp. 5-9, 1970.

Collier et al. *Optical Holography*, Academic Press, 1971 (pp. 12, 270-271 and 283).

Kirk-Othmer, *Encyclopedia of Chemical Technology*, Third Edition, Vol. 10, "Fiber Optics", p. 142, John Wiley & Sons, NY, 1980.

Kapany, *Fiber Optics, Principles and Applications*, "Image Transmission by Fiber Optics", pp. 81-82, Academic Press, NY, 1967.

*Primary Examiner*—Bruce Y. Arnold
*Attorney, Agent, or Firm*—Koda and Androlia

[57] ABSTRACT

A holographic apparatus for continually sensing, transmitting and reconstructing a three-dimensional image including a device for receiving a holographic interference pattern, a device for creating a holographic interference pattern on the receiving device, a device for transmitting the received holographic interference pattern, a device for converting the transmitted holographic interference pattern to a holographic interference pattern which is representative of the three-dimensional image and a source of coherent light illuminating the holographic interference pattern on the converting means to reconstruct the three-dimensional image.

21 Claims, 5 Drawing Sheets

HOLOGRAPHIC DISPLAY IMAGING PROCESS

This is a continuation-in-part of application Ser. No. 919,551, filed Oct. 15, 1986, now abandoned, which is a continuation-in-part of application Ser. No. 788,248, filed Oct. 17, 1985, now abandoned.

BACKGROUND OF THE INVENTION

1. Field of the Invention

This invention relates to the process by which three-dimensional images, moving or stationary, may be transformed and transmitted, and then reconstructed for viewing purposes by the use of optical wavelength reconstruction techniques; and particularly to the use of holograms for said purposes.

2. Prior Art

Figure 1:
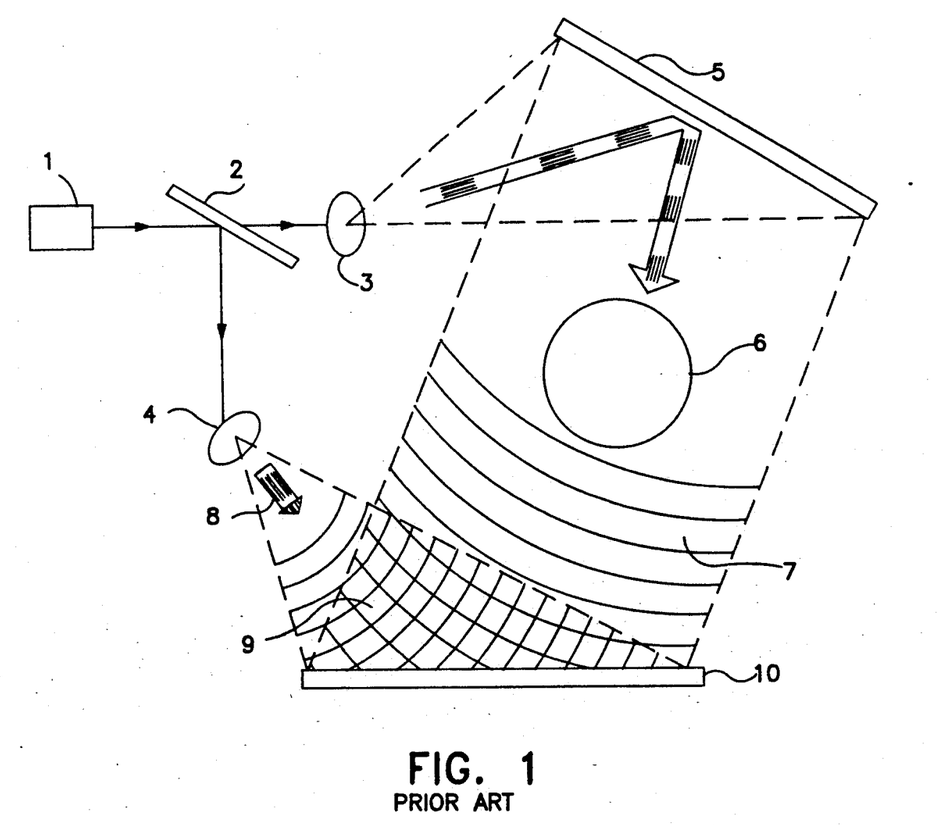
FIG. 1 shows the process of producing a hologram of the prior art.

The process of optical wavelength reconstruction is generally referred to as holography. Techniques for producing holograms vary, but in essence they entail what is shown in FIG. 1 as follows: a source beam of coherent light, usually a laser 1, is passed through a beam splitter 2 producing two distinct beams: an object beam 7 and a reference beam 8. With the aid of lenses 3 and 4, each beam of coherent laser light is spread to form a wavefront of light. The object beam 7 wavefront is directed at a mirror 5 which reflects the wavefront onto the object 6. The currently accepted recording device, film 10, then receives the object beam 7 reflected from the object 6 and reference beam 8 and records the image as a pattern on photographic film.

Figure 2:
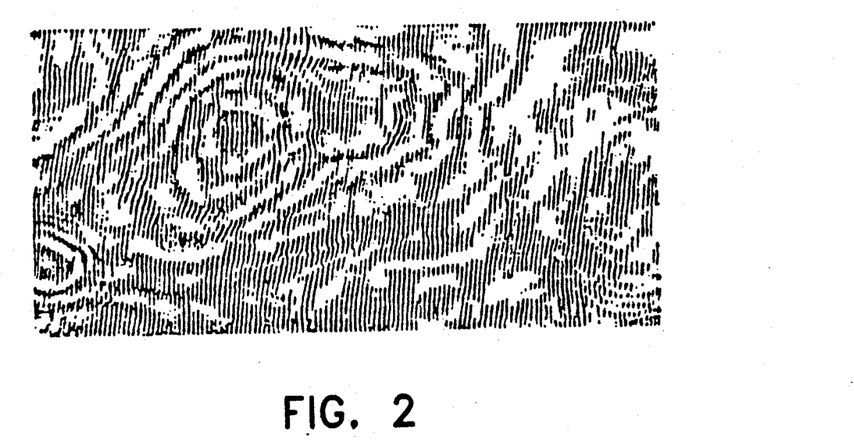
FIG. 2 indicates the interference patterns of a hologram under visible incoherent light and extreme magnification.

The reflected illumination from the object is in the form of expanding spherical wavefronts, derived from the interaction of the coherent light wavefront and every point on the object, producing an irregular wavefront that contains certain information about the object. When the second beam, the reference beam 8, from the same coherent light source, is directed to the recording device without being reflected from the object, the two beams form an interference pattern on the film. This interference pattern is formed by the constructive and destructive interference of the object and reference beam wavefronts on the film. This interference pattern, as shown in FIG. 2, is comprised of intensity variations due to variations in the phases and amplitudes of the two wavefronts. In summary, the recording and subsequent reillumination of an interference pattern of the object and reference beams of coherent light is a hologram.

Holograms differ from conventional photography in two important ways. Conventional photography records an image of reflected incoherent visible light by focusing the image, through the use of a lense, on film. When developed, this image is then visible to the naked eye using any standard non-coherent light source. A standard holographic recording uses no focusing device to form an image, but rather records the interference patterns of coherent light. When developed, a hologram produces a non-recognizable image when viewed by the naked eye under non-coherent light. The hologram can however, be illuminated by a coherent light source (using a reference wavefront) producing an interference pattern in which the original interference pattern is reconstructed, and when viewed gives an illusion which appears as if the original object is suspended in space.

An article by D. Gabor 161,777 (1948) and which appeared in Proceedings of the Royal Society. (London) A197,454 (1949) describes this type of optical reconstruction and states that images produced by this technique possess all the three-dimensional characteristics of the original object.

SUMMARY OF THE INVENTION

It is an object of this invention to use optical wavelength reconstruction techniques to produce a real-time hologram.

Another object of the invention is to be able to transform the real-time hologram, by means of a transducing device and high speed computers, into a digital computer signal.

A further object of the invention is to provide the means by which this computer signal can be reconstructed to produce a hologram which can be seen visually to have the same three-dimensional characteristics of the original object, in constant real-time.

A still further object of the invention is to provide the means by which a ditigal computer signal may be transmitted and received via electromagnetic radiation.

An additional object of the invention is to provide the means by which this real-time hologram can be stored and reconstructed at any future point in time.

It is still another object of the present invention to provide a means for transmitting and reconstructing three dimensional images of large events such as plays, sporting events and concerts.

In keeping with the principles of the present invention, the objects are accomplished by a unique three-dimensional image transmitting and reconstruction system using optical wavelength reconstruction. This system includes a means for receiving a continuously changeable holographic interference pattern, a means for continuously creating a holographic interference pattern on the receiving means, a means for converting the received holographic interference pattern into transmittable signals, a means for receiving the transmittable signals, a means for continuously converting the transmittable signals back to said holographic interference pattern and a source of coherent light illuminating said holographic interference pattern on said converting means whereby the image of the three-dimensional object is reconstructed.

BRIEF DESCRIPTION OF THE DRAWINGS

The above-described principals and objects of the present invention will become more apparent with reverence to the following figures in which like reference numerals denote like elements and in which.

DETAILED DESCRIPTION OF THE INVENTION

As described in FIG. 1 using a laser 1, beam splitter 2, lenses 3 and 4, mirror 5, and object 6, an interference pattern 9 of light waves is created. If this interference pattern 9 were recorded on film 10 and illuminated under non-coherent light, it would look similar to FIG. 2 (depending upon the object used, the pattern would be individual and unique to it).

Figure 3A:
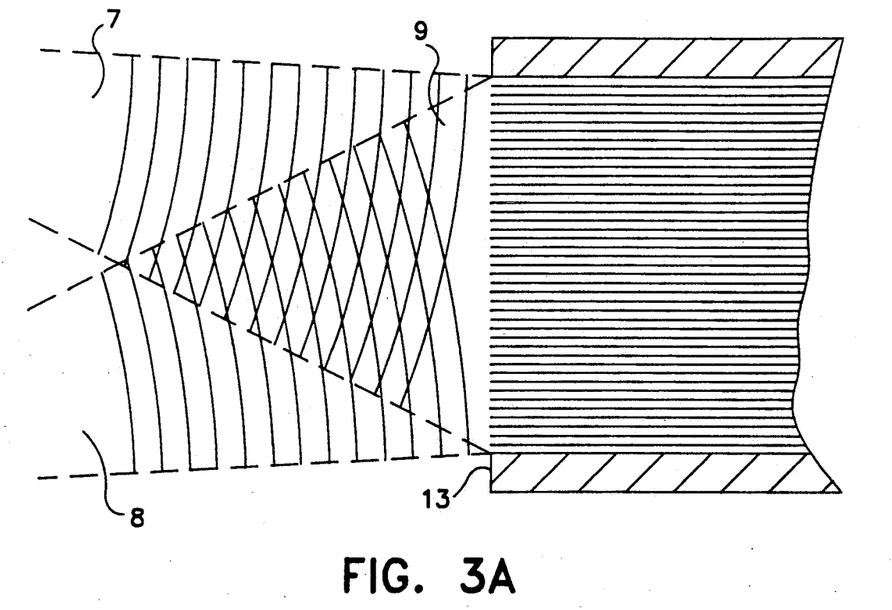
FIGS. 3A and 3B indicate the transducing process of converting the real-time hologram into a transmittable signal.
Figure 3B:
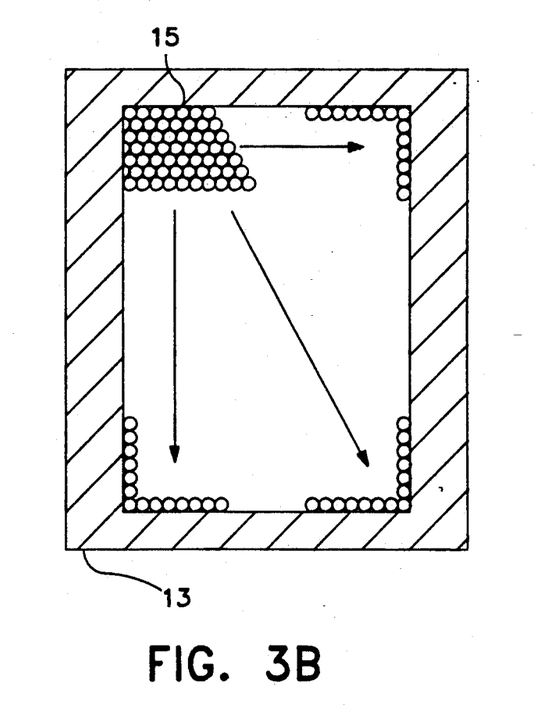

Instead of using film 10 to record (over a period of time) the interference pattern 9 as shown in FIG. 1, the present invention replaces the film 10 with the open ends 15 of fiber optic cables 13. For instance, if the hologram in the previous example were recorded on a 12 inch square piece of film, this film would be replaced with a 12 inch bundle 15 of thousands of open end fiber optic cables 15 as shown in FIGS. 3A and 3B.

As seen in FIG. 2, an exposed piece of holographic film resembles "contour" patterns of an elevation map. Further magnification reveals that these "contour" patterns consist of tiny dots of either white or black. The size and amount of fiber optic cable fibers to be used within the bundle is to be set to equal one fiber optic cable fiber for each and every dot of black or white in the contour patterns.

This process is similar to that of printing photographic pictures. In the printing process, the picture, under magnification, consists of thousands of tiny dots, which when viewed in the proper perspective create a picture. Similarly, television pictures are created by tiny dots of light illuminated on a phosphorous screen. In both these processes, printing and television, the ability to recognize images is based upon tiny dots, the amount of which and viewing distance from them determines the resolution of the picture.

The same principle is to be applied in this process. The scale (amount and size) of fiber optic cables used must be sufficient to capture each and every dot created by the interference pattern of light.

Figures 4, 5:
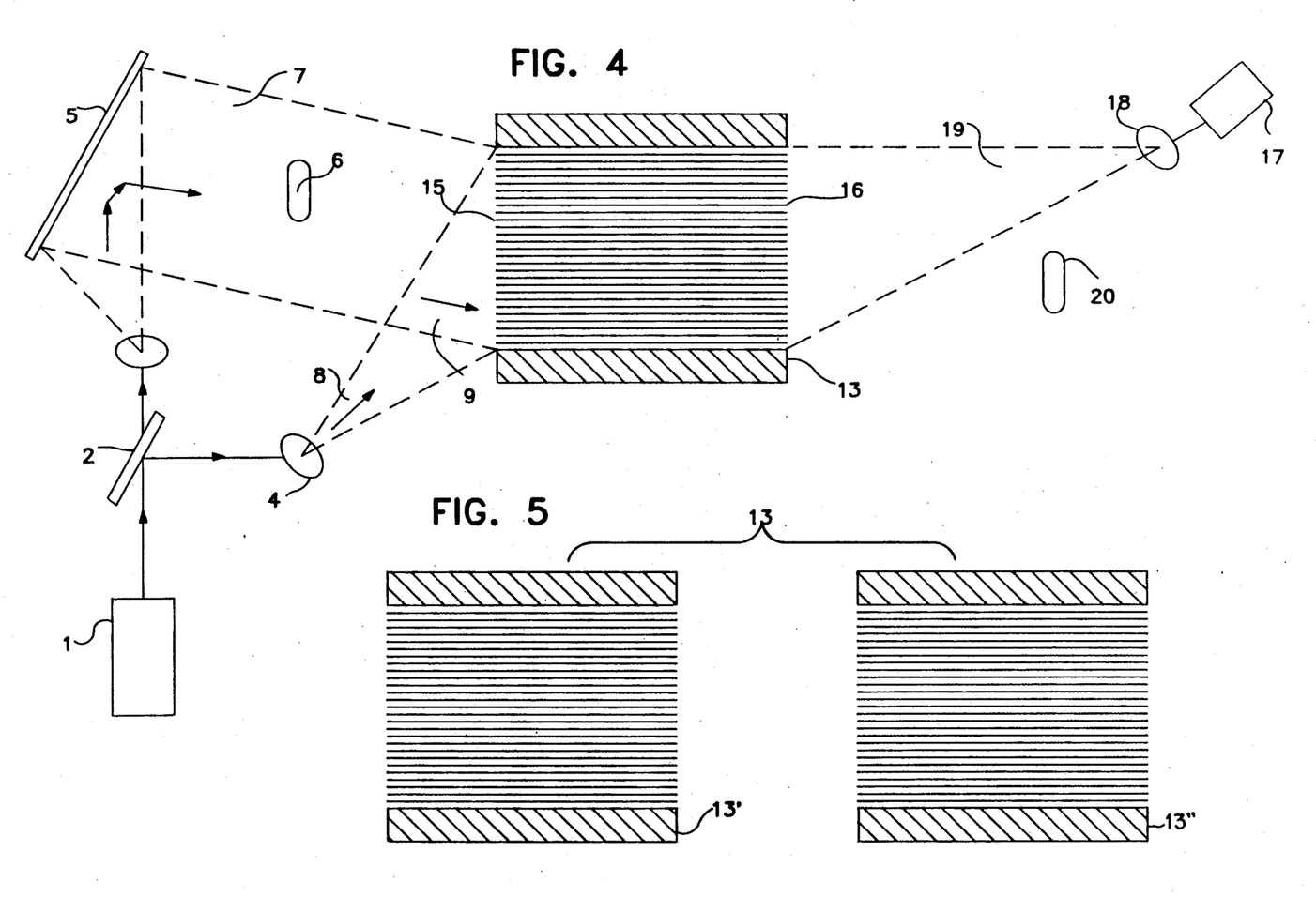
FIG. 4 shows my process in its simplest form. The interference pattern enters one side of the fiber optic bundle, is transmitted through the bundle, and then is re-illuminated with coherent light.
FIG. 5 illustrates the fiber optic bundle split into two places.

Within the process, a length of fiber optic cables (bundle) 13 replaces a piece of film 10 used in "standard" holographic processes. FIG. 1 depicts such a "standard" process. FIG. 4 depicts my process in its simplest form.

FIGS. 3A and 3B indicate the interference pattern which enters the fiber optic bundle 13 on side 15, in the form of tiny dots of either light or darkness (white or black), and which reappears at side 16 of the fiber optic bundle 13 in the same pattern. This pattern when illuminated with a reference beam 19 of coherent laser light 17 will make the object 20 reappear, possessing all the three-dimensional characteristics of the original object.

In the holographic process using film 10, the interference pattern takes time to accumulate onto the film 10, then the film is developed, and then it is reilluminated to recreate the hologram. In the present invention, there is no accumulation time, as the interference pattern goes directly into side 15 of the fiber optic bundle 13 and exits on side 16, and then is reilluminated at that time as shown in FIG. 4. There is no "lag" time, and therefore a real-time holographic image is produced.

The first possible modification of this process is shown in FIG. 5. Here the fiber optic bundle 13 is split into bundles 13' and 13", adding sides 21 and 22 and additional processes are used as described below.

Figure 6:
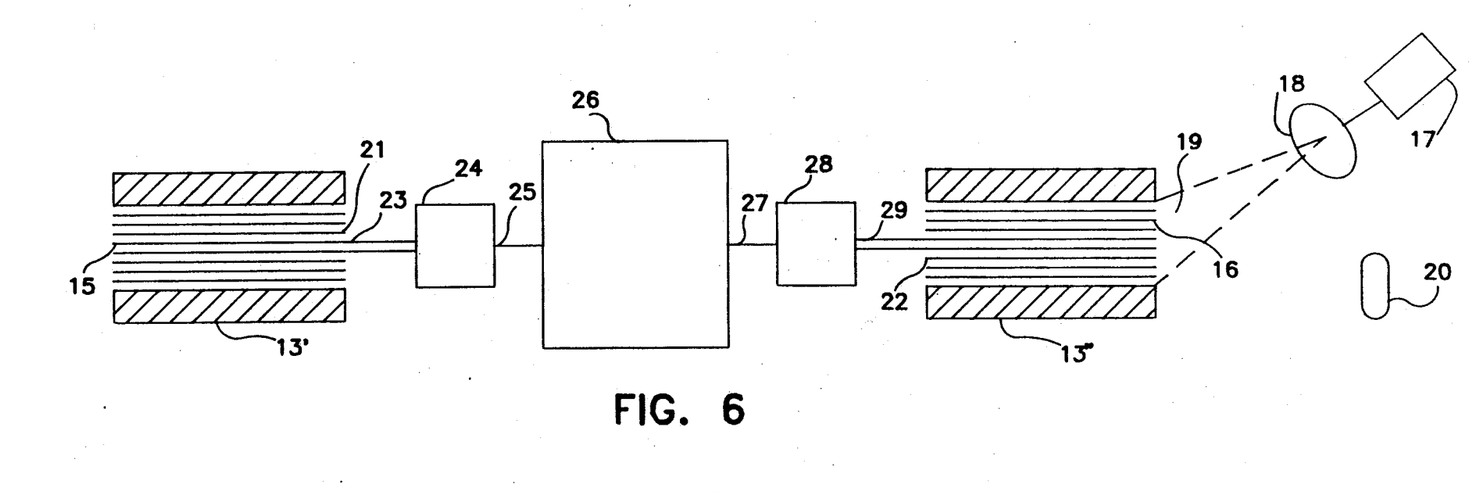
FIG. 6 indicates the fiber optic bundle connected cable by cable to the transducing device, the output of which is then directed into a computer. The output of the computer is then directed into a transducing device, and then back into the fiber optic cable whose output is then re-illuminated by coherent light to produce the holographic image.

In FIG. 6, the "inside" portion of the fiber optic bundle 13', side 21 is then connected, cable by cable 23 to transducers 24 capable of converting light wave impulses into digital electrical pulses. This transducer is commonly used for example by the telephone companies to convert electrically generated telephone speech impulses into light waves for use in fiber optic cable transmission of telephone conversations, and then is reconverted into electrical impulses for use in standard telephones and generally comprises photo detectors such as photodiodes or phototransistors.

These converted pulses at point 25 are then inputted into a computer 26 capable of recognizing and recording all the information coming from each and every cable in the fiber optic bundle at very high speeds. Such computers exist in the prior art for processing video images and only require certain obvious modifications. The output of the computer 27 is then directed at the transducers 28 which converts it back to light impulses at side 22. The transducers 28 can be any device capable of changing electrical signals to light such as light emitting diodes. These impulses reappear at side 16, exactly as they originally appeared at side 15, and when reilluminated with the coherent laser light 17, the three-dimensional holographic image appears.

In addition, it should be apparent that the analog to digital conversion and the digital to analog conversion can be accomplished utilizing a general purpose prior art digital computer or microprocessor using generally known software which exists in the prior art and includes an algorithm which performs the conversion function.

Figure 7:
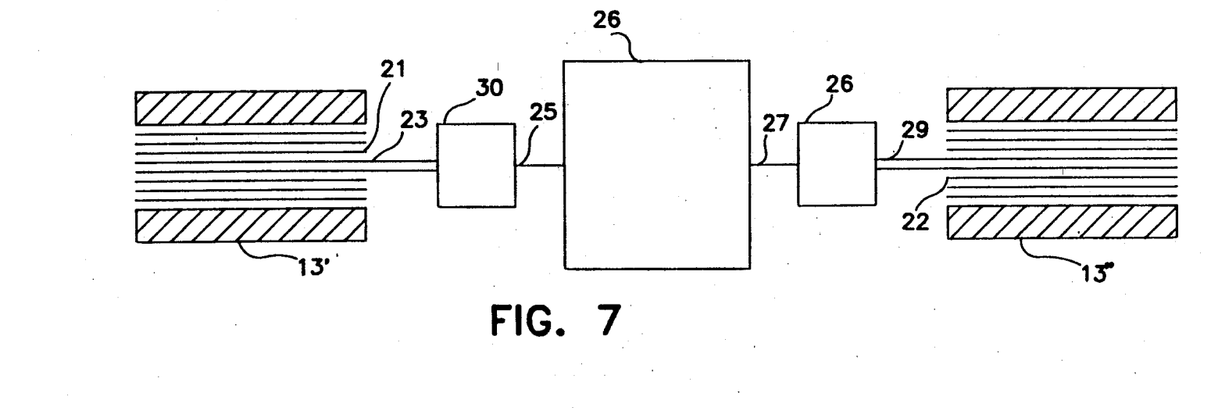
FIG. 7 indicates another possible variation in transducing devices that may be used.

Possible variations in the type of transducers used include but are not limited to the following. In FIG. 7, the output of side 21 of the fiber optic bundle is directed at arrays of photodiodes 30 (similar to those used in television cameras) which are appropriate in scale and size to receive the output of the fiber optic bundle 23 and convert it to output digital electrical impulses 25 which a computer 26 is capable of recognizing and utilizing. Also, the output 27 of the computer 26 is directed at light emitting diodes (LED) 31 which are of appropriate scale and size to convert the output 27 of the computer 26 into usable light signals for the fiber optic bundle 13".

Figure 8:
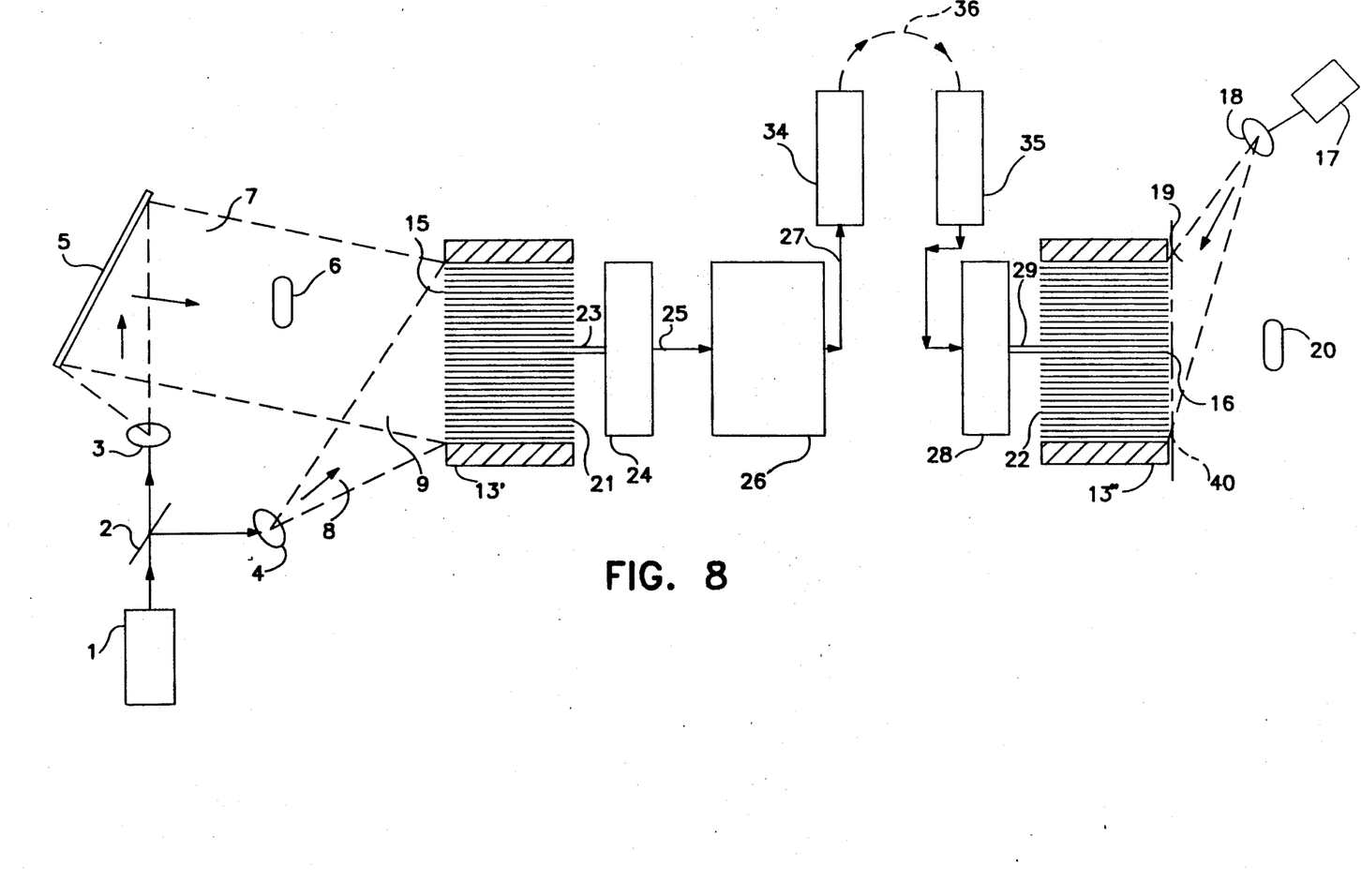
FIG. 8 is another embodiment illustrating the system.

A further modification of this process is depicted in FIG. 8. Here the digital computer signal output 27 is directed to a transmitter 34 for broadcast to various types of receiving devices 35 via transmission media 36. These may include but are not limited to satellites, multipoint distribution systems, or microwave systems.

An additional modification is when the output of side 21 of the fiber optic bundle is inputted directly into telephone fiber optic cables for transmission and reconstruction at the other end.

A still further modification to the present invention can be made at side 16 of the fiber optic bundle 13" shown in FIG. 8. In the process described previously, the light signals which appear at side 16 are reilluminated by a coherent laser light 17 to display the object. In this modification the light signals which reappear at side 16 may be directed onto a surface or screen 40 which is shown in phantom lines in FIG. 8. The surface or screen 40 may be made from any translucent or transparent material such as a plastic, paper, etc. so long as the material can function as a diffractor. The laser light 17 will then be directed onto the surface or screen 40, which, acting as a diffraction grating for the fiber optic bundle 13" will redirect, reflect or bend the lightwaves in such a manner as to form the holographic image. The function of the surface or screen 40 will be to form a diffraction grating for redirecting the light signals emitted from the fiber optic cable 16 rather than for the purpose of accumulating or recording the light signals.

Figure 9:
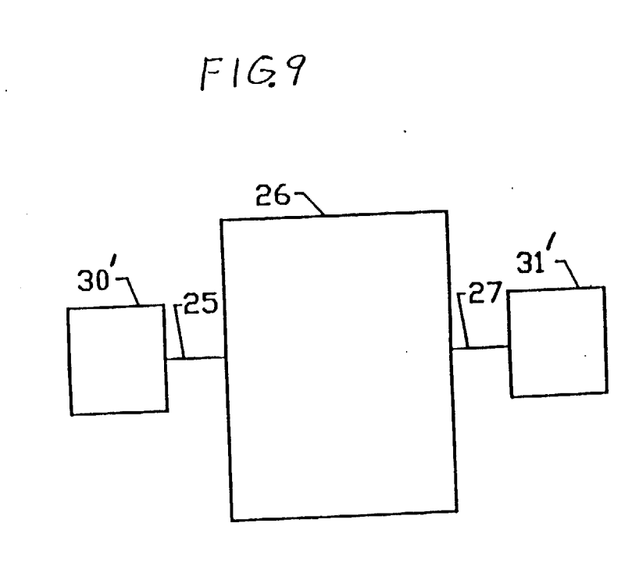
FIG. 9 is another embodiment illustrating the system of Applicant's invention.

Referring to FIG. 9, shown therein is another embodiment of the present invention. In this embodiment it may be desirable to incorporate the analog to digital and the digital to analog conversion functions together with the functions of the fiber optic bundles. To achieve this end, the fiber optic bundles are entirely removed and the interference pattern created by the laser falls directly onto one surface of the analog to digital convertor 30'. The analog to digital convertor 30' can be an array of photodiodes as previously described or some other device such as a charge coupled device (CCD) which is utilizable for video image to signal conversion. The output of the computer 26 is then directed to the digital to analog convertor 31' and this digital to analog convertor may be an array of light emitting diodes which can be used in conjunction with a translucent or transparent defractor screen as previously described or some other device such as a liquid crystal display (LCD) and preferably a diffraction type LCD.

With the digital to analog convertor 31', the recreated interference pattern can be produced on one surface thereof and the laser light is directed onto the interference pattern to reconstruct the three-dimensional image.

The process of the present invention may be adapted to the use of multicolor and moving objects using multiple lasers, multicolor lasers and color filters and multiple systems. For example, the tiny dots of light which are inputted into the fiber optic cables from the different multicolor lasers can be of different colors and intensities, as long as the remainder of the process in any system is adjusted to recognize the differences between colors. While the above system has been described as requiring the use of coherent light from a laser, it could also be implemented using incoherent light using techniques such as those used in white light holography.

In addition, since this process occurs in real-time, the objects used to produce the holographic images may be of any type, including human subjects, and all their movements. This is possible since any movement will just change the interference pattern which in real time is just processed through the system to produce the virtual image. This facilitates the use in holographic television, telephones, stage, sports, meetings, etc,.

It should also be mentioned that since this process includes the conversion of light waves into digital electrical signals which can be entered and outputted via computer, that it will also be possible, by means of massive computer storage, to record these signals for future use. This means that at any point in time these recorded signals can be outputted from the computer to a transducer device and reconstructed into a virtual image, stationary or moving.

This ability to record and store this information will also facilitate the formation of artificial holograms, based upon information in the computer's storage. Combinations and manipulations of this information will be possible, producing an unlimited variety of possible holographic images based upon the information stored.

It should be clear that while the form and processes of my invention herein shown and described constitutes the preferred design and uses of the invention, it is not intended to illustrate all of the equivalent forms or ramifications thereof. It will be obvious that modifications may be made without departing from the spirit or scope of this invention, and it is my intention to cover all such changes not detailed here that fall within the true spirit and scope of this invention.

I claim:

1. A holographic apparatus for continually sensing, transmitting and reconstructing a three-dimensional image comprising:
   a means for receiving a continuously changeable holographic interference pattern, said means for receiving a continuously changeable holographic interference pattern comprising an end of a bundle of fiber optic fibers;
   a means for continuously creating a changeable holographic interference pattern which is representative of a three-dimensional image on said receiving means;
   a means for transmitting the received holographic interference pattern;
   a means for continuously recreating said continuously changeable holographic interference pattern from said transmitted holographic interference pattern; and
   a source of light illuminating said recreated changeable holographic interference pattern on said means for continuously recreating said continuously changeable holographic interference pattern; whereby the sensed three-dimensional image is reconstructed.

2. A holographic apparatus according to claim 1, wherein said means for transmitting the received holographic interference pattern comprises a cable of fiber optic fibers.

3. A holographic apparatus according to claim 2, wherein said means for continuously recreating said changeable holographic interference pattern from said transmitted holographic interference pattern comprises another end of a bundle of fiber optic fibers.

4. A holographic apparatus according to claim 3, wherein said means for transmitting the received holographic interference pattern further comprises an array of photosensitive devices, the number of said devices corresponding to the number of fibers in said fiber optic bundle, said array of photosensitive devices for converting said changeable holographic interference pattern into a plurality of electrical signals and said means for continuously recreating said changeable holographic interference pattern further comprises an array of photo-emitting elements which receive the plurality of electric signals and for converting the signals to light, the number of said photo-emitting elements in said array corresponding to the number of fibers in said fiber optic bundle.

5. A holographic apparatus according to claim 4, wherein said means for continuously transmitting the received holographic interference pattern further comprises a electromagnetic frequency transmitter for receiving the electric signals from said photo-sensitive array and for converting the electric signals into electromagnetic signals and a receiving means for receiving the electromagnetic signals and for converting them into electric signals which are applied to said photo-emissive devices.

6. A holographic apparatus according to claim 5, wherein said means for transmitting the received holographic interference pattern further comprises an analog to digital convertor for converting the electric signals from said photo-sensitive array to digital signals to be transmitted by said transmitting means and a digital to analog convertor for converting digital output signals from said receiver means into said electric signals for said photo-emissive array.

7. A holographic apparatus according to claim 6, wherein said array of photo-sensitive sensing devices comprises an array of photo-diodes and said array of photo-emissive elements comprises an array of light-emitting diodes.

8. A holographic apparatus according to claim 7, further comprising a means for storing said digital signals from said analog to digital convertor.

9. A holographic apparatus according to claim 8, wherein said analog to digital convertor and said digital to analog convertor comprise computers.

10. A holographic apparatus according to claim 3, wherein a screen is provided between said another end of said bundle of fiber optic fibers and said source of coherent light.

11. A holographic apparatus according to claim 10, wherein said screen is a diffraction screen.

12. A holographic apparatus for continuously sensing and storing a three-dimensional image comprising:
  a means for receiving a continuously changeable holographic interference pattern which is representative of a three-dimensional image on said receiving mean;
  a means for converting the received holographic interference pattern into storable signals, said means for converting comprising an analog to digital conversion means; and
  a means for storing said storable signals.

13. A holographic apparatus according to claim 12, wherein said means for receiving a continuously changeable holographic interference pattern comprises the end of a bundle of fiber optic fibers.

14. A holographic apparatus according to claim 13, wherein said means for converting said received holographic interference pattern into storable signals comprises an array of photo-sensitive elements for converting the holographic interference pattern into analog electric signals and an analog to digital convertor for converting the analog electric signals to digital signals.

15. A holographic apparatus according to claim 14, wherein said means for storing said storable signals comprises a computer.

16. A holographic apparatus according to claim 15, wherein said array of photo-sensitive elements comprises an array of photo-diodes.

17. A holographic apparatus for continuously sensing, transmitting and reconstructing a three-dimensional image comprising:
  a means for receiving a continuously changeable holographic interference pattern, said means for receiving the continuously changeable holographic interference pattern comprising an electronic receiving means for converting the continuously changeable holographic interference pattern to digital electronic signals;
  a means for continuously creating a changeable holographic interference pattern which is representative of a three-dimensional image on said receiving means;
  a means for transmitting the received holographic interference pattern;
  a means for continuously recreating said continuously changeable holographic interference pattern from said transmitted holographic interference pattern; and
  a source of light illuminating said recreated changeable holographic interference pattern on said means for continuously recreating said continuously changeable holographic interference pattern;
  whereby the sensed three-dimensional image is reconstructed.

18. A holographic apparatus according to claim 17, wherein said electronic receiving means comprises a charge coupled device.

19. A holographic apparatus according to claim 17, wherein said means for recreating said continuously changeable holographic interference pattern is an electronic converting means for converting the digital electronic signals to said continuously changeable holographic interference pattern.

20. A holographic apparatus according to claim 19, wherein said electronic converting means comprises a LCD.

21. A holographic apparatus according to claim 19, wherein said electronic converting means comprises a LCD array and a diffraction screen.

* * * * *

UNITED STATES PATENT AND TRADEMARK OFFICE
CERTIFICATE OF CORRECTION

PATENT NO. : 5,184,232

DATED : Feb. 2, 1993

INVENTOR(S) : Michael Burney

It is certified that error appears in the above-identified patent and that said Letters Patent is hereby corrected as shown below:

In the Drawings:
Please add the attached drawing of FIG. 9.

Signed and Sealed this

Twenty-ninth Day of March, 1994

*Attest:*

BRUCE LEHMAN

*Attesting Officer*     *Commissioner of Patents and Trademarks*